M. GOODFELLOW, DEC'D.
J. O. DYE, ADMINISTRATOR.
BEET HARVESTER.
APPLICATION FILED OCT. 1, 1909.

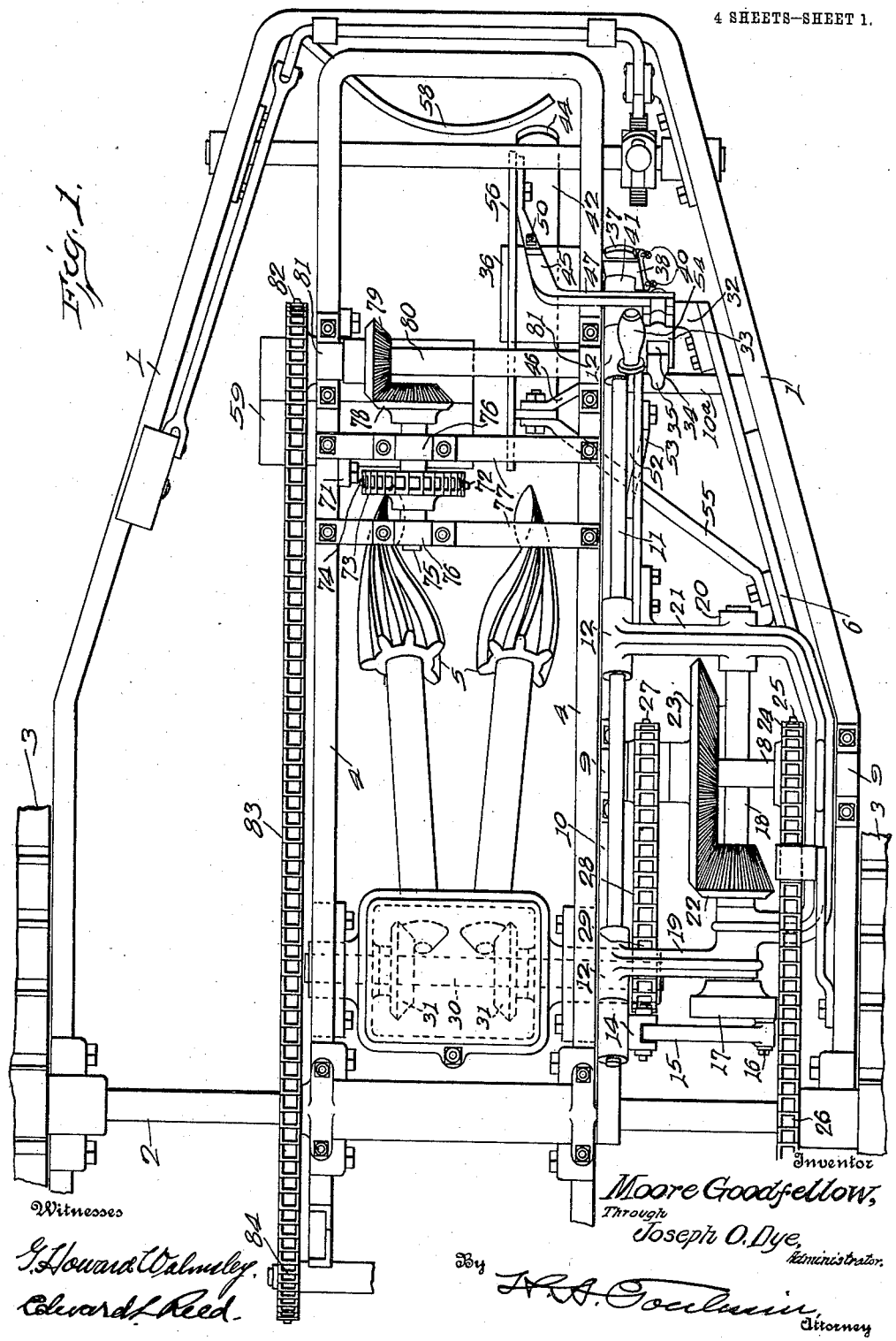

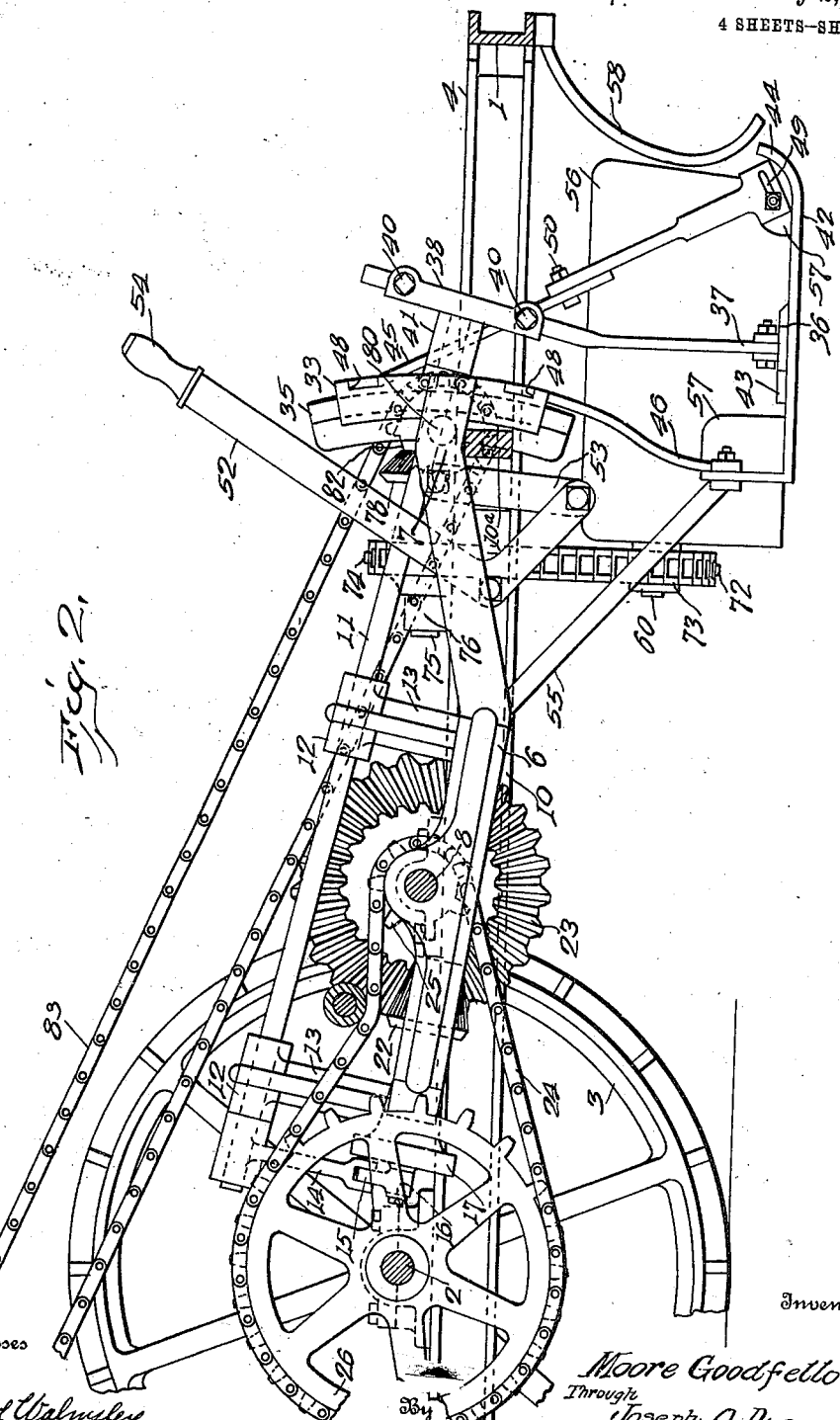

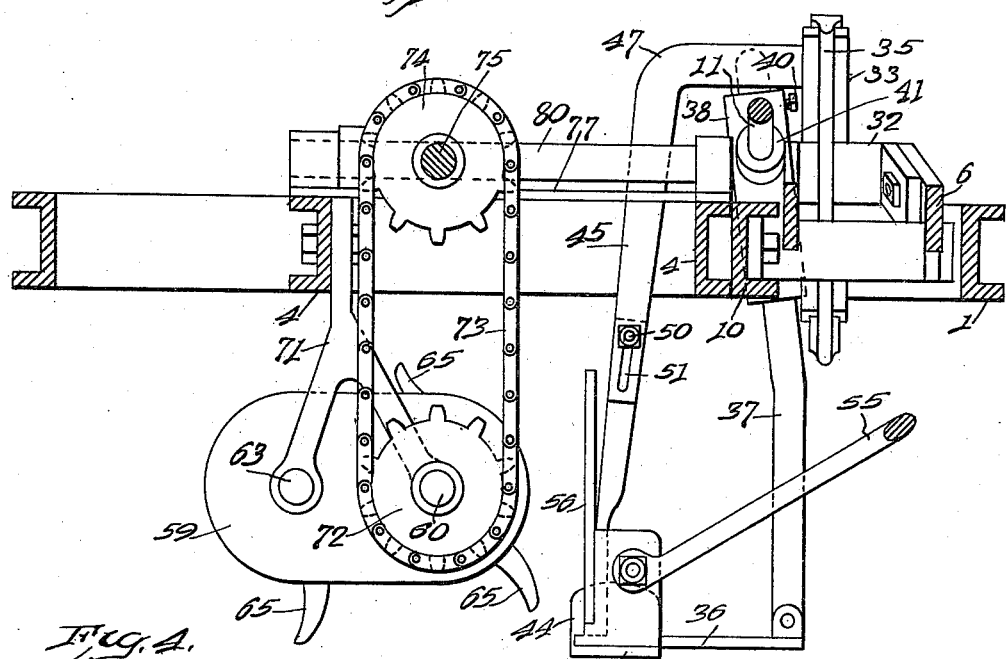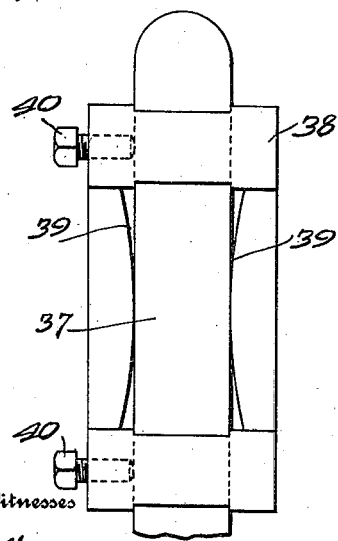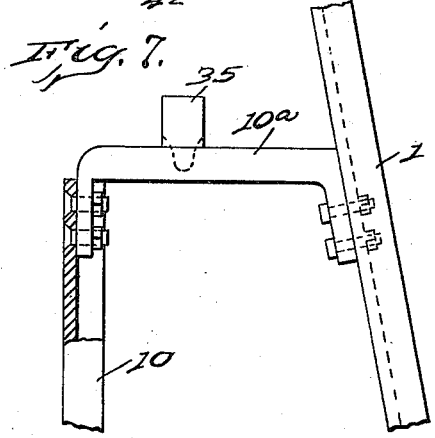

991,149.

Patented May 2, 1911.
4 SHEETS—SHEET 4.

Witnesses
G. Howard Walmsley
Edward Reed

Inventor
Moore Goodfellow,
Through
Joseph O. Dye,
Administrator.
By
Attorney

UNITED STATES PATENT OFFICE.

MOORE GOODFELLOW, DECEASED, LATE OF COLUMBUS, OHIO; JOSEPH O. DYE, ADMINISTRATOR; SAID GOODFELLOW ASSIGNOR OF ONE-HALF TO JOSEPH O. DYE, OF COLUMBUS, OHIO.

BEET-HARVESTER.

991,149.  Specification of Letters Patent.  Patented May 2, 1911.

Original application filed November 1, 1907, Serial No. 400,291. Divided and this application filed October 1, 1909. Serial No. 520,600.

*To all whom it may concern:*

Be it known that MOORE GOODFELLOW, deceased, late a citizen of the United States, and resident of Columbus, in the county of Franklin and State of Ohio, invented new and useful Improvements in Beet-Harvesters, of which the following is a specification, reference being had therein to the accompanying drawings.

This invention relates to beet harvesters, and is a division of the application filed by MOORE GOODFELLOW Nov. 1, 1907, Serial Number 400,291.

The object of the invention is to provide a beet harvester with means for topping the beets while they are still in the ground and for moving the beet tops or foliage out of the path of the beet pullers which form a part of the harvester.

To this end, it is a further object of the invention to so construct and arrange the several parts of the harvester that, when the beet tops are severed from the beets, they will fall on top of the beet row and away from the topping mechanism and will be engaged by a clearer which will move them away from the beet row and out of the path of the pullers.

With this and other objects in view the invention consists in certain novel features and in certain combinations and arrangements of parts hereinafter to be described, and then more particularly pointed out in the claims.

Figure 5:
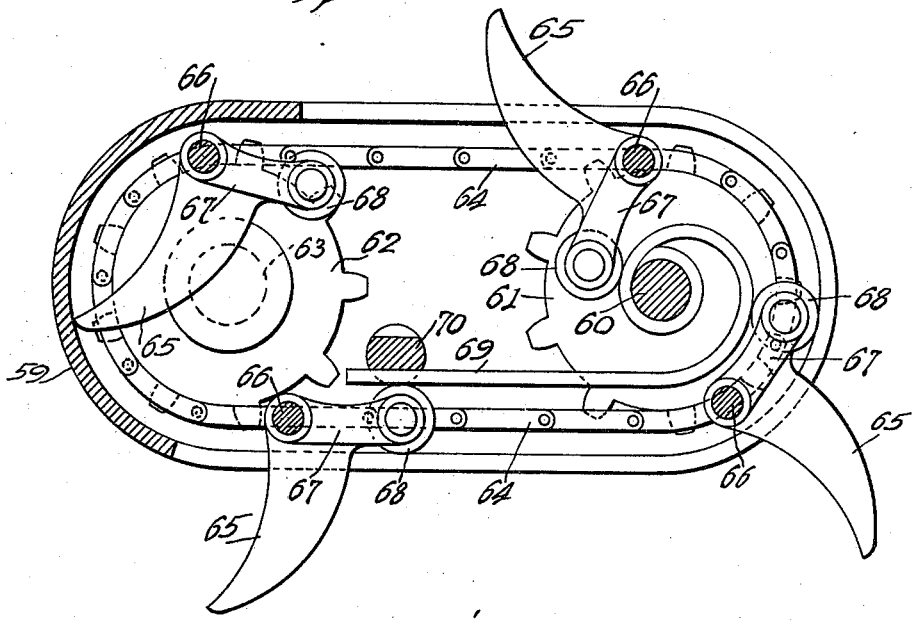
Figure 6:
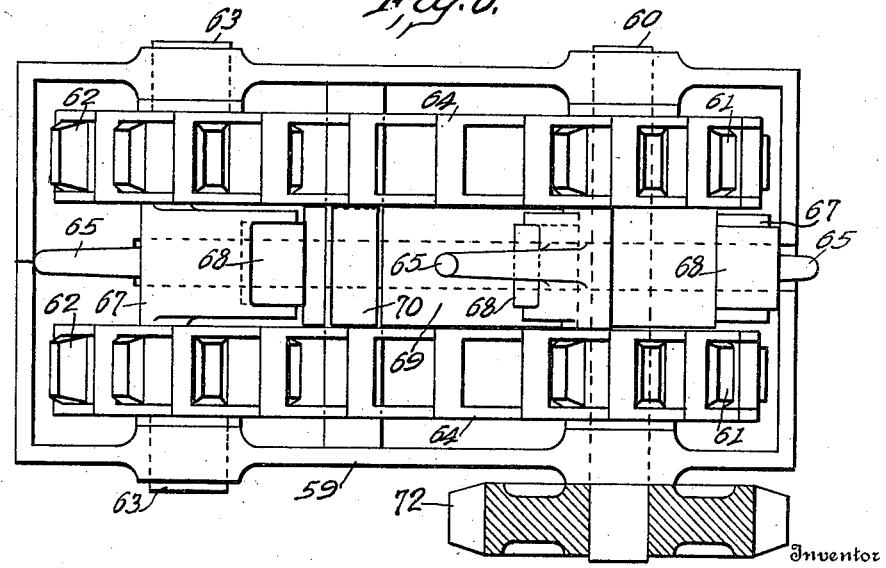

In the accompanying drawings, Figure 1 is a top plan view of a beet harvester equipped with the present invention; Fig. 2 is a side elevation of the same with the outer member of the main frame broken away; Fig. 3 is a transverse sectional view, taken in the rear of the topper and looking forward; Fig. 4 is a detail view of the supporting bracket for the shank of the cutter; Fig. 5 is a longitudinal, vertical section taken centrally through the conveyer; Fig. 6 is a top plan view of the same with the upper portion of the casing broken away; and Fig. 7 is a detail view of the supporting bracket for the guide plate.

In these drawings the invention has been illustrated as embodied in a harvester of known construction and comprising a main frame 1 supported at one end upon a driving axle 2 having suitable traction wheels 3.

Arranged within the main frame 1 and pivotally mounted upon the axle 2 is an auxiliary frame 4 adapted to move in a vertical plane about its pivotal center and having pulling cones 5 supported therefrom. This frame is capable of vertical adjustment, as stated, to move the pulling cones into and out of engagement with the ground. It will be obvious, however, that the invention can be readily adapted to beet harvesters of different construction. As here shown, the cutter blade and the supporting mechanism therefor are adjustably mounted within the main frame, and, to this end a supplemental or carrier frame 6 is mounted within the main frame and has its outer side member inclined toward the inner side member to conform the frame to the contour of the main frame.

The forward end of the supplemental frame is preferably inclined upwardly to a point above the main frame, as shown at 7. This frame is pivotally mounted upon a shaft 8 by means of suitable bearings secured to the lower side of the frame members. The shaft 8 is, in turn, journaled in suitable bearings 9 carried by the outer side member of the main frame 1 and a suitable fixed part of the main frame located at some point within said side member thereof. This inner member, as herein shown, consists of a beam or bar 10 extending substantially parallel with the length of the main frame and preferably supported at its rear end on the axle 2, by means of a suitable bearing, and at its forward end by a bracket 10ᵃ which is rigidly secured to the adjacent side member of the main frame.

A rockshaft 11 extends longitudinally of the supplemental frame 6 and is journaled in suitable bearings 12 supported on said supplemental frame by means of suitable brackets 13. This shaft may be operated in any suitable manner, but it is preferred to operate the same from the traction wheels of the harvester, and, to this end, the rear end of the shaft 11 is provided with a crank arm 14, which is connected by means of a suitable connecting rod 15 with the wrist pin 16 of a crank wheel 17 which is rigidly secured to the rear end of a shaft 18. This shaft is journaled in the rear transverse member 19 of the supplemental frame 6 and extends forwardly beneath the shaft 8 and has its forward end journaled in a suitable bearing 20 carried by the transverse member 21 of said supplemental frame. The shaft 18 has mounted thereon a bevel pinion 22 adapted to mesh with a bevel gear 23 rigidly secured to the shaft 8. The longitudinal axis of the pinion 22 being inclined at an angle to the radius of the gear 23, owing to the depression of the forward end of the shaft 18, it is necessary to cut the teeth of the bevel gear 23 at such an angle to the radius of said gear that these teeth will be parallel with the teeth of the pinion 22 at their point of contact. The shaft 8 is rotated by means of a sprocket chain 24 extending about a sprocket wheel 25 mounted on the shaft 8 and a second sprocket wheel 26 mounted on the axle 2. The shaft 8 also has mounted thereon a second sprocket wheel 27 connected by means of a sprocket chain 28 with a sprocket wheel 29 on a shaft 30 mounted in suitable bearings on the auxiliary frame 4, which is provided with suitable bevel gearing 31, by means of which the pulling cones 5 are rotated in opposite directions to raise the beets from the ground.

The forward ends of the side members of the supplemental frame 6 are connected by means of a transverse member 32 secured at its opposite sides to said side members and provided between the same with a suitable slide block 33 having in its inner face a guideway 34 adapted to engage a guide 35. This guide is preferably segmental in shape and is mounted on the bracket 10ª, which is rigidly secured to the side member of the main frame 1, thus forming a guide for the forward end of the supplemental frame during its vertical movement.

A cutter is supported from the forward end of the supplemental frame 6 in any suitable manner and is adapted to be moved transversely to said frame and to the beet row to engage the beet tops and sever the same from the beets. In the construction herein shown, the cutter comprises a thin blade 36, sharpened on its inner and forward edges, pivotally connected to the lower end of an arm or shank 37, the upper end of which is rigidly secured to the forward end of the rockshaft 11 which projects beyond its forward bearing 12. The supporting bracket 38 is preferably in the form of an elongated block having a longitudinal groove formed in one face thereof and adapted to receive the upper end of the shank 37. The walls of this groove are flared outwardly toward the opposite ends thereof, thus providing a curved guideway 39 for the shank 37 and permitting the same to be rocked about a pivotal center formed at the point of engagement of the curved side walls of said groove with the sides of the shank, thus varying the angle at which the shank 37 extends from the shaft 11, and thereby adjusting the stroke of the cutter carried by said shank relatively to its support. The shank is held in its adjusted position in the bracket 38 by set screws 40. The bracket 38 has a socket or sleeve 41 formed on the rear side thereof and adapted to receive and to be rigidly secured to the projecting end of the rockshaft 11.

A suitable guide is provided for the cutter 36 to support the same in proper relation to the beet row. This guide preferably consists of a shoe 42 having a guideway 43 adapted to receive the cutter 36. This shoe has its forward end bent upwardly, as shown at 44, and is supported from the supplemental frame in any suitable manner, preferably by means of arms or rods 45 and 46, which have their upper ends bent at an angle thereto, as shown at 47, and secured in transverse grooves 48 formed in the outer wall of the guide block 33. These rods are preferably adjustably connected to the shoe by means of bolts extending through a fixed portion of the shoe and through slots 49 formed in the lower ends of the rods. The rod 45 is also shown as adjustable longitudinally by forming the same in two sections and connecting these sections by means of one or more bolts 50 extending through slots 51 in said members.

A suitable brace 55 extends between the rear end of the shoe 42 and the supplemental frame 6, thus holding this shoe against longitudinal movement. This shoe is also preferably provided with an upwardly extending shield 56 secured at its lower end to the inner side of the shoe, preferably by bolting the lower edge thereof to upwarly extending flanges or members 57 carried by said shoe and through which the guide or slot 43 for the cutter 36 is formed. Thus, it will be seen that the cutter and its supporting mechanism are all carried by the supplemental frame 6 and are moved in a vertical plane when said supplemental frame is moved about its pivotal center. Suitable means are provided for so moving the supplemental frame, and, as here shown, this means consists of a bell crank lever 52 pivotally connected to the inner member 10 of the main frame and having one arm connected by a link 53 with the forward end of the frame 6 and its other end extended upwardly to form an operating handle 54.

A suitable lifting device is provided for engaging the foliage or beet tops and raising the same from the path of the shoe. This device preferably comprises a rod 58 bent downwardly and curved so that its rearmost portion extends in the rear of the forward edge of the shield 56 and its point extends in front of the shoe 42. Thus, when the rod is in its operative position, the point of the same will be moved beneath the beet tops and the same will be raised out of the path of the shoe, and, when released by the rod 58, will be engaged by the shield 56 and retained in their elevated position until the same have been severed by the cutter, when they drop to the ground and lie either upon the beet row or close thereto.

To prevent the tops or foliage from being engaged and becoming entangled with the pullers or cones, it is necessary that means should be provided for moving these tops to one side of the beet row and out of the path of the pullers, and, to this end, suitable clearing mechanism is arranged between the toppers and the pullers. This mechanism may be of any suitable construction and may be arranged in any suitable manner, but, preferably, it is of the construction and arrangement herein shown, in which the clearing mechanism is so arranged relatively to the topping mechanism and the shield carried thereby as to coöperate with these parts and entirely remove the beet tops from the path of the pullers. The clearer itself comprises an endless belt having conveyer fingers movably mounted thereon and means for actuating said fingers to cause the same to stand at an angle to the belt during that portion of its travel when the finger is adjacent to the beet row and to cause the said conveyer finger to assume a position substantially parallel with the belt when the finger reaches a point near the outer end of said conveyer, thus releasing the tops which have been engaged by the conveyer finger. In its preferred construction this conveyer comprises a casing 59 having a slot extending through the top and bottom walls from a point near the outer end thereof and through the inner end of said casing.

A shaft 60 is journaled in the slotted end of the casing and has mounted thereon near the side walls of said casing suitable sprocket wheels 61. Other sprocket wheels 62 are journaled on stud shafts 63 mounted in the opposite end of the casing, thus leaving the space between the sprocket wheels 62 open and unobstructed. Suitable sprocket chains 64 extend about the sprocket wheels 61 and 62 and are provided with a plurality of conveyer fingers 65 which are pivotally connected to said sprocket chains, preferably by means of shafts 66 extending through the fingers and secured at their opposite ends in the chains, thus pivotally mounting the fingers between the two sprocket chains. Each finger has its inner end turned at an angle thereto, as shown at 67, and provided with a bearing surface, such as the roller 68. A suitable guide 69 is mounted within the casing 59 and extends substantially parallel with the chain 64 for a portion of its length. This guide is preferably supported at its inner end upon the shaft 60, as shown, and is curved from its point of connection with said shaft upwardly to a point adjacent to said chain and follows the same downwardly and outwardly to a point near the rear sprocket wheel and is there engaged by a suitable shaft' or bar 70 extending transversely of said casing. This bar 70 also serves to connect the opposite sides of the casing which is formed in two parts. Thus it will be seen that, as the conveyer fingers 65 move with the sprocket chain along the upper portion of the casing, the roller 68 will engage the upper portion of the guide or track 69, thereby swinging the finger about its pivotal center and moving the same to a position substantially at right angles to the chain, and that the same will be held rigidly in this position until the finger has reached a position near the outer sprocket wheels and the roller 68 has passed off the outer end of the track or guide 69, when the finger 65 will be moved rearwardly about its pivotal center by contact with the casing or a fixed part thereof and caused to assume a position substantially parallel with the chain, thus freeing the same from the beet tops and allowing the same to enter the casing and travel in this position until the roller 68 again comes into contact with the track 69. This clearer may be supported in any suitable manner, but it is preferred to mount the same by means of brackets or arms 71 which are secured at their upper ends to the auxiliary frame and preferably have their lower ends bifurcated and connected to the outer ends of the shaft 60 and stud shafts 63, respectively. The clearer may be driven in any desired manner, but it is preferred to secure a sprocket wheel 72 on the outer end of the shaft 60 and connect the same by means of a sprocket chain 73 with a second sprocket wheel 74 mounted on a shaft 75 which is journaled in suitable bearings 76 mounted upon transverse bars 77 secured to the auxiliary frame 4. This shaft has mounted thereon a bevel gear 78 adapted to mesh with a bevel pinion 79 secured to a shaft 80, which is journaled in suitable bearings 81 also mounted on the auxiliary frame. This shaft has on its outer end a sprocket wheel 82 which is driven by means of a sprocket chain 83 from a sprocket wheel 84 mounted upon a rotatable part of the harvester, the sprocket wheel 84 being here shown as mounted upon a shaft forming part of the conveyer mechanism, which is not shown.

It will be observed that, by the arrangement of the several parts herein shown and described, they coöperate to remove the beet tops from above the row of beets from which the tops have been severed. The topping mechanism proper being supported at one side of the beet row, the blade passes across the row, severs the beet tops and is immediately withdrawn, allowing the beet tops to fall to the ground without otherwise displacing the same. The shield, which is carried by the shoe, serves to prevent the beet tops from adhering to the blade and being drawn to one side of the row into the topping mechanism, and also serves to cause the tops to fall toward that side of the beet row opposite the topping mechanism. The clearing mechanism is arranged immediately in the rear of the topping mechanism and between the same and the pulling devices. The construction and arrangement of this clearing mechanism is such that it will engage the beet tops lying on the beet row and will move the same to a point entirely removed from the beet row and out of the path of the pulling devices, thereby preventing the same from being engaged by or becoming entangled with said pulling devices. It will be further noted that the construction of the clearer is such as to give it a long, transverse movement and thus carry the tops entirely beyond the beet row. By causing the beet tops to fall on the beet row or toward the side thereof opposite the topping mechanism and by arranging the clearing mechanism in a position to engage these tops at a point immediately above the beet row and convey the same toward that side of the beet row opposite the topping mechanism, the tops are all removed and the beet row remains perfectly free from obstruction to the passage of the pulling devices.

I wish it to be understood that I do not desire to be limited to the details of construction shown and described, for obvious modifications will occur to a person skilled in the art.

Having thus fully described the invention, what is claimed as new and desired to be secured by Letters Patent, is:—

1. In a beet harvester, the combination, with a pulling device, and a cutter in advance of said pulling device, of a shield arranged to engage the severed tops and cause them to fall away from said cutter, and a clearer to move said tops out of the path of said pulling device.

2. In a harvester, the combination, with a main frame, and pulling devices carried thereby, of topping mechanism arranged at one side of the central line of said pulling devices, and a clearing device supported from said frame in the rear of said topping mechanism and on that side of said central line opposite said topping mechanism, and means for moving said clearing device in a direction to carry the tops away from said central line.

3. In a beet harvester, the combination, with a main frame, and pulling devices carried by said main frame, of topping mechanism carried by said main frame in front of said pulling devices and at one side of the central line of said pulling devices, a shield supported adjacent to said topping mechanism, and a clearer supported from said main frame on a transverse line extending between said topping mechanism and said pulling devices, and means for moving said clearer in a direction to carry the tops away from said central line.

4. In a machine of the character described, the combination, with pullers arranged to operate on opposite sides of a central line, topping mechanism arranged in front of said pullers at one side of said central line and comprising a cutter adapted to engage the beets along said central line, and means for causing the severed tops to fall on that side of said central line opposite said topping mechanism, of a clearer arranged in the rear of said topping mechanism to move said beet tops away from said central line.

5. In a machine of the character described, the combination, with pullers arranged on opposite sides of a central line, topping mechanism supported in front of said pullers and comprising a cutter adapted to engage the beets along said central line, of a shield supported adjacent to said topping mechanism in a position to cause the severed tops to fall away from said topping mechanism, and means supported on that side of said central line toward which said tops fall to carry said tops away from said central line.

6. In a machine of the character described, the combination, with pulling devices arranged on opposite sides of a beet row, topping mechanism supported in front of said pulling devices and on one side of said beet row comprising a movable cutter, a shield supported between the normal position of said topping mechanism and said beet row and having a passage for said cutter, of a clearer supported on a transverse line extending between said topping mechanism and said pulling devices and on that side of said beet row opposite said topping mechanism.

7. In a machine of the character described, the combination, with pulling devices arranged on opposite sides of a beet row, topping mechanism supported in front of said pulling devices and on one side of said beet row and comprising a movable cutter, a shield supported between the normal position of said cutting mechanism and said beet row and having a passage for said cutter, of a clearer supported on a transverse line extending between said topping mechanism and said pulling devices and comprising an endless carrier extending from a point above said beet row to a point removed therefrom.

8. In an apparatus of the character described, the combination, with a main frame, and a cutter supported by said frame, of a conveyer supported from said frame and comprising an endless belt, means for actuating said belt, conveyer fingers carried thereby, and means for moving said fingers relatively to said belt, whereby said fingers are caused to project at an angle to said belt during a portion of its travel and to lie substantially parallel therewith during a portion of its travel.

9. In an apparatus of the character described, the combination, with a main frame, and a cutter supported by said frame, of a conveyer supported from said main frame comprising a pair of sprocket wheels, a sprocket chain passing about said wheels, means for actuating said chain, a guide mounted adjacent to said sprocket chain and extending substantially parallel therewith, and conveyer fingers pivotally mounted on said chain and having inwardly extending projections adapted to engage said guide.

10. In an apparatus of the character described, the combination, with a main frame, and a cutter supported by said main frame, of a conveyer supported from said main frame and comprising a casing having a slot through its top and bottom walls and one end thereof, a shaft journaled in said casing near the slotted end thereof, means for rotating said shaft, sprocket wheels mounted on said shaft near the opposite walls of said casing, stud shafts mounted in the opposite walls of said casing near the closed end thereof, sprocket wheels mounted on said stud shafts, sprocket chains extending around said sprocket wheels on the respective sides of said casing, conveyer fingers pivotally mounted between said sprocket chains and having inwardly extending projections, and a guide mounted within said casing and extending substantially parallel with said sprocket chains for a portion of their length and adapted to be engaged by a projection on said fingers.

In testimony whereof, I affix my signature in the presence of two witnesses.

JOSEPH O. DYE,
*Administrator of the Estate of Moore Goodfellow.*

Witnesses:
HONOR E. ROBBINS,
S. ELNO GOODFELLOW.

---

Copies of this patent may be obtained for five cents each, by addressing the "Commissioner of Patents, Washington, D. C."